Jan. 19, 1926.
E. R. PURVIS
PUMP JACK
Filed Sept. 22, 1925
1,570,280
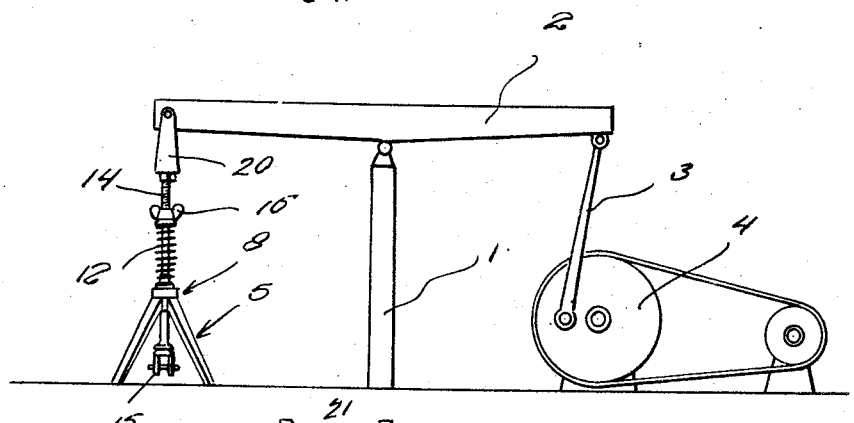
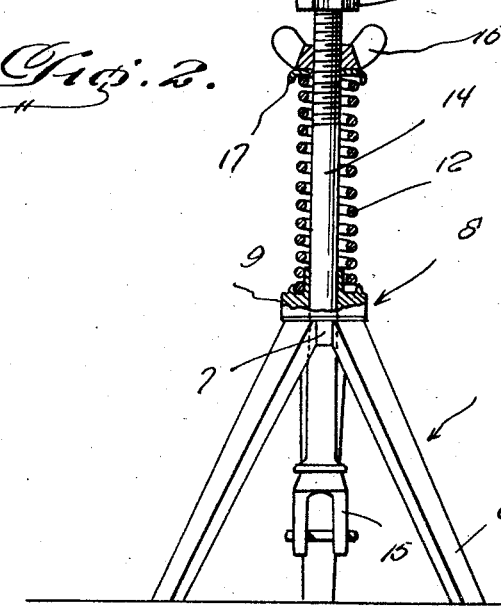
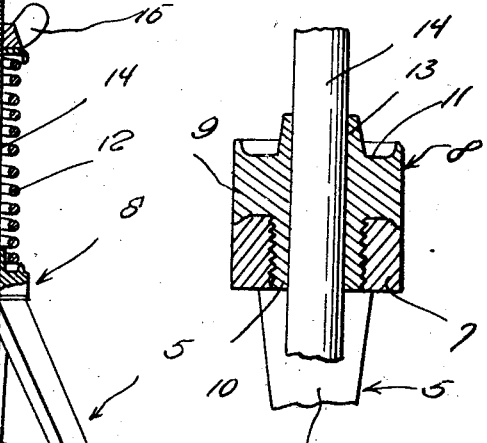
Inventor
E. R. Purvis,
By
Attorney Patented Jan. 19, 1926.

1,570,280

UNITED STATES PATENT OFFICE.

EDWARD R. PURVIS, OF SHREVEPORT, LOUISIANA.

PUMP JACK.

Application filed September 22, 1925. Serial No. 57,882.

*To all whom it may concern:*

Be it known that I, EDWARD R. PURVIS, a citizen of the United States, residing at Shreveport, in the parish of Caddo and State of Louisiana, have invented certain new and useful Improvements in a Pump Jack, of which the following is a specification.

This invention relates broadly to an improved pump jack, and it has more particular reference to a device which is constructed for cooperation with one end of the rocking beam to act as a weight equalizer, and a shock absorber.

Briefly, the invention has reference to a stand which is located over and above the equipment of the pump, this stand being formed with a central guide through which an especially constructed connecting member has vertical sliding movement, this member being connected at its top to one end of the walking beam, and at its bottom to the upper end of the pump rod.

One feature of the construction is the improved stand which is in the form of a tripod, and which is provided at its top with a ring like head for connection of an especially constructed guide bushing.

Another feature is the bushing which in addition to forming a guide is constructed to provide a seat for one end of a shock absorbing spring.

An equally important feature is the reciprocatory connecting rod which is slidable through the bushing, and which is screw threaded at its top for reception of a thumb nut capable of being adjusted during the operation of the pump without slowing up or stopping any part of the equipment, this being accomplished with a full degree of safety to the operator.

Other features and advantages of the invention will become apparent from the following description and drawing.

In the accompanying drawing forming a part of this application and in which like numerals are employed to designate like parts throughout the same:

Figure 1 is a side view of a conventional pump jack showing the improved shock absorbing and weight distributing device in association with one end of the rocking beam.

Figure 2 is an enlarged detail sectional and elevational view of the device showing the details, and their arrangement more plainly.

Figure 3 is a still further enlargement showing the construction of the upper end of the tripod and the especially constructed bushing.

In the drawing the reference character 1 designates a standard on the top of which a common walking beam 2 is mounted for oscillation. Connected to one end of the beam is a pitman 3 which depends and has eccentric connection with a belt driven member 4.

At the opposite end of the beam is the improved weight distributing and shock absorbing device. As before indicated, this comprises a stand 5, and this stand is made up of tripod legs 6 and the upper ends of which is an internally screw threaded ring like head 7. This head has its top fashioned for retention of an especially constructed guide member 8. The member comprises a body 9, having a centrally depending screw threaded neck 10 tapped into the screw threaded head 7. The top of the body is designed to provide a cup-shaped recess 11 for reception of the lower coil of the shock absorbing spring 12. If desired, the body may be formed with an upstanding boss 13 which together with the body and neck forms a smooth walled bushing for sliding reception of the connecting rod 14.

The rod 14 embodies a smooth surfaced portion which slides in this bushing, and the lower end thereof is fashioned to provide a coupling head 15 for connection to the pump equipment. The upper portion of the rod is screw threaded and a thumb nut 16 is threaded thereon. Just beneath this thumb nut is a cupped washer 17 receiving the top end of the coil spring 12. As before stated, the opposite end of this spring is located in the cup 11 formed in the top of the special bushing. Just above the thumb nut is a set nut 18, and above this is a jamb nut 19. A yoke 20 is swingably mounted between these two nuts and carries the cross pin 21 by means of which it is pivotally connected to the adjacent end of the walking beam 2.

It is clearly apparent from the description and drawing that the device serves effectively for relieving the jack and the pumping equipment of undue shocks and jars, and makes for a smooth acting pump.

Under the circumstances the pump rods will be given a more true rectilinear movement, and will be relieved of undue wear. These and other advantages and features of the invention have doubtless been made apparent from the foregoing description and drawing. Therefore, a more lengthy description is thought unnecessary.

While the preferred embodiment of the invention has been shown and described, it is to be understood that minor changes coming within the field of invention claimed may be resorted to if desired.

Having thus described the invention, what I claim is:—

1. In a structure of the class described, a tripod, a guide bushing detachably connected with the upper portion of the tripod, a rod having a smooth surface portion slidable through said bushing, a coupling on the lower end of the rod, the upper end of the rod being screw threaded, a coil spring surrounding said rod and bearing at one end against the bushing, an adjustable stop on the threaded portion against which the opposite end of the coil spring bears, and an adjustably mounted yoke on the upper end of said rod to adapt it for connection with the rocking beam of a pump jack.

2. In a structure of the class described, the combination, a stand comprising a tripod provided at its top with an internally screw threaded ring-like head, a guide member embodying a screw threaded neck tapped into said head, a body portion having its top fashioned to form a spring seat, a vertically disposed reciprocatory rod having a smooth surfaced portion slidable through said guide, a coupling on the lower end of the rod, the upper end of the rod being screw threaded, a coiled spring surrounding said rod and bearing at its lower end against said seat, and an adjustably mounted yoke on the upper end of said rod to adapt it for connection with a walking beam on a pump jack.

In testimony whereof I affix my signature.

EDWARD R. PURVIS.